United States Patent
Poulsen et al.

[11] Patent Number: 6,081,352
[45] Date of Patent: Jun. 27, 2000

[54] IMAGE SCANNER UTILIZING ROLLERS TO BIAS AN ORIGINAL IN A HOLDER AGAINST A SUPPORT SUCH THAT THE HOLDER ENTERS THE IMAGE SCANNER BY A NIBBLING ACTION OF THE ROLLER AND SUPPORT

[75] Inventors: Christian Poulsen, Frederiksberg; Anders Heger, Copenhagen, both of Denmark

[73] Assignee: Imacon ApS, Copenhagen, Denmark

[21] Appl. No.: 09/029,697

[22] PCT Filed: Sep. 12, 1996

[86] PCT No.: PCT/DK96/00384

§ 371 Date: Mar. 13, 1998

§ 102(e) Date: Mar. 13, 1998

[87] PCT Pub. No.: WO97/10670

PCT Pub. Date: Mar. 20, 1997

[30] Foreign Application Priority Data

Sep. 13, 1995 [DK] Denmark .................................. 1016/95

[51] Int. Cl.[7] ............................................... H04N 1/04
[52] U.S. Cl. ............................ 358/493; 358/487; 358/496
[58] Field of Search ........................................ 358/487, 493, 358/490, 474, 506, 505, 492, 498, 496; 369/429; 355/75; H04N 1/04

[56] References Cited

U.S. PATENT DOCUMENTS

| | | |
|---|---|---|
| 3,640,482 | 2/1972 | Von Hippel ............................. 242/372 |
| 4,440,491 | 4/1984 | Takahama .................................. 355/75 |
| 4,712,009 | 12/1987 | Ohgoda et al. .......................... 250/589 |
| 4,963,997 | 10/1990 | VanScooter .............................. 358/493 |
| 5,088,813 | 2/1992 | Wakefield ................................ 352/183 |
| 5,208,680 | 5/1993 | Sugimoto et al. ....................... 358/493 |
| 5,422,737 | 6/1995 | Atoji et al. .............................. 358/492 |
| 5,574,578 | 11/1996 | Dresch et al. ........................... 358/490 |
| 5,583,663 | 12/1996 | Boeve ..................................... 358/487 |

FOREIGN PATENT DOCUMENTS 0 521 311 A1  1/1993  European Pat. Off. .
0 574 916 A2  12/1993  European Pat. Off. .

*Primary Examiner*—Cheukfan Lee

[57] ABSTRACT

An image scanner in which an original is scanned by a trilinear CCD array, i.e. the original is scanned line by line, three lines at the time, one line for each color. Thus, at a specific time "only" the area of the original that is scanned by the trilinear CCD array at that time has to be positioned in focus of the imaging means of the image scanner while the remaining part of the original may be positioned anywhere and may adopt any suitable form. Thus, there is no need for all parts of the original to be kept flat and planar as required in known flat bed scanners. The original is kept flat and straight along a line to be scanned by imparting a substantially cylindrical shape, such as a circular cylindrical shape, to at least part of the original. The original is scanned along lines that are substantially parallel to the generatrix of the cylindrical part of the original. Thus, the fact that all parts of the original are not scanned simultaneously is exploited to simplify the positioning of the original in the image scanner.

11 Claims, 5 Drawing Sheets

IMAGE SCANNER UTILIZING ROLLERS TO BIAS AN ORIGINAL IN A HOLDER AGAINST A SUPPORT SUCH THAT THE HOLDER ENTERS THE IMAGE SCANNER BY A NIBBLING ACTION OF THE ROLLER AND SUPPORT

This application is the national phase under 35 U.S.C. §371 of prior PCT International Application No. PCT/DK 96/00384 which has an International filing date of Sep. 12, 1996, which designated the United States of America, the entire contents of which are hereby incorporated by Reference.

FIELD OF THE INVENTION

The present invention relates to an image scanner, and more particularly, to the handling of a sheet formed original before and during scanning in an image scanner.

BACKGROUND OF THE INVENTION

Two different classes of image scanners are known in the art. Flatbed scanners and drum scanners.

In a flatbed scanner, the original to be scanned has to be held extremely flat in order for all areas of an image on the original to be positioned in focus of the optics of the image scanner during recording of that area. For this purpose, the original is typically placed in a holder comprising two holder parts with glass plates. The original may be clamped between the two glass plates.

It is a disadvantage of known holders for flatbed scanners that the manual attachment of the original in the holder does not assure complete contact between the original and the glass plates so that Newton rings may be created by the partial separation between these surfaces.

It is a another disadvantage that the holder requires regular and careful cleaning to avoid dust and dirt to accumulate on the glass surfaces. Dirty surfaces impair the quality of scanned images and may scratch originals.

It is yet another disadvantage that the holder requires careful handling to keep the glass plates free of scratches.

It is still another disadvantage that the accurate positioning of the original in the holder require skills of the operator and is tedious and time consuming.

It is a further disadvantage that the holder can not apply sufficient strong forces to the original to stretch it to the required planar form. Typically, the original forms concave and convex buckles between the glass plates of the holder.

In a drum scanner, the original to be scanned is mounted on a transparent image reading drum. The original is manually attached and fixed onto the cylindrical surface of the image reading drum with adhesive tape, and is detached from the drum by peeling the adhesive tape off the original.

It is a disadvantage of the drum scanner that the attachment of the original to the drum does not assure complete contact of the original with the image reading drum, and in many cases, its poor contact with or partial separation from the drum causes Newton's rings.

It is another disadvantage of the drum scanner that because of the high rotational speed of the drum, the original has to be firmly attached to the drum to withstand high centrifugal forces. The firm mounting of the original requires skill and is time consuming.

SUMMARY OF THE INVENTION

The general object of the invention is to provide an improved user friendly method of feeding an original into an image scanner, an image scanner utilizing such a method, and a holder for holding an original before and during scanning in an image scanner utilizing such a method.

The terms sheet formed original and original refer to any flat object suitable for scanning, such as paper printed with signs, such as letters, drawings, graphical symbols, etc, photographs, transparencies, etc.

It is a further object of the present invention to provide an image scanning method and apparatus wherein the original need not be mounted between sheets or plates of transparent materials, such as glass.

It is a still further object of the present invention to provide an image scanning method and apparatus wherein the original need not be mounted with adhesive tape.

According to the invention these and other objects are fulfilled by a method of scanning a sheet formed original in an image scanner including supporting means for supporting a sheet formed original, imaging means, such as optics, such as a lense, etc, and light detecting means, such as a CCD, etc, said method comprising imparting a substantially cylindrical shape, such as a circular cylindrical shape, etc, to at least part of the original to be supported by the supporting means, moving the imaging means and the supporting means in relation to each other in a direction substantially parallel to the generatrix of the cylindrical surface.

Further, according to the invention the above mentioned objects are fulfilled by an image scanner for scanning a sheet formed original comprising light detecting means for detection of light transmitted from the original, imaging means for imaging at least part of the original onto the light detecting means, supporting means for maintaining at least part of the original in a substantially cylindrical shape, and first moving means for moving the imaging means and the supporting means in relation to each other in a direction substantially parallel to the generatrix of the cylindrical part of the original.

Preferably, an image scanner according to the present invention comprises a solid state imaging device, typically a charge coupled device (CCD), for recording of an image. The CCD is an array of a large number of light sensitive elements connected to each other as an analog shift register. In each element of the CCD a charge is formed that is proportional to the light energy incident on the element during an integration period. The analog charge of each element is shifted serially out of the CCD and processed by signal processing electronics of the image scanner. Typically, the analog charges are converted to digital values whereby a digital representation of the scanned image is formed. The digital values may be further processed by signal processing hardware and software of the signal processing electronics before transmission to external equipment through an interface.

Typically, the CCD of the image scanner is a linear CCD in which the light-sensing elements are arranged in a single line. During scanning, the original is moved relative to the CCD array and the original is scanned one line at a time. For scanning color images, either filters can be placed in front of the array, which then makes three passes across the original during image scanning, or, preferably, a trilinear CCD array, which comprises three linear CCDs positioned side by side, is used. Each line of the trilinear CCD array is covered by its own color filter, typically in the form of dye that is painted over the elements.

In the present invention, the fact that all parts of the original are not scanned simultaneously is exploited to simplify the positioning of the original in the image scanner compared to known methods and image scanners.

For example in a preferred embodiment of the invention, the original is scanned by a trilinear CCD array, i.e. the original is scanned line by line, three lines at the time, one line for each color. Thus, at a specific time "only" the area of the original that is scanned by the trilinear CCD array at that time has to be positioned in focus of the imaging means of the image scanner while the remaining part of the original may be positioned anywhere and may adopt any suitable form. Thus, there is no need for all parts of the original to be kept flat and planar as required in known flat bed scanners.

According to the present invention, the original is kept flat and straight along a line to be scanned by imparting a substantially cylindrical shape, such as a circular cylindrical shape, to at least part of the original. The original is scanned along lines that are substantially parallel to the generatrix of the cylindrical part of the original.

It is a further advantage of the present invention that the bending of the original into a substantially cylindrical shape produces a small saddle-effect, i.e. the original becomes a small deflection along the line to be scanned towards the axis of the cylindrical part of the original. The imaging means of the image scanner becomes less expensive when it is designed to focus on a curved line than when it is designed to focus on a straight line. Preferably, the imaging means is positioned so that the original is deflected away from the imaging means.

To scan the original, the area of the original that is imaged onto the light detecting means, such as a CCD array, may be swept across the original, e.g. by moving the original in relation to stationary imaging means and light detecting means, by moving the imaging means in relation to stationary light detecting means and a stationary original, e.g. by rotation of a mirror, by moving the imaging means and the light detecting means together in relation to a stationary original, etc, or, the original may be scanned by a combination of these movements.

It is presently preferred to move the original relative to stationary imaging means and light detecting means, preferably, in a direction substantially parallel to the generatrix of the cylindrical part of the original.

In a preferred embodiment of the invention, the supporting means comprise a body having a cylindrical surface, preferably a circular cylindrical surface, preferably one or more first rollers, over which the original is passed.

The image scanner may further comprise biassing means, such as one or more second rollers, such as spring biassed rollers, for biassing the original against the cylindrical surface engaging with the original.

Still further, the image scanner may comprise driving means for displacing the supporting means with the original relative to the light detecting means.

It is an advantage of the present invention that feeding of the original into the image scanner has been reduced to a very simple operation of placing the original on supporting means, e.g. rollers, which operation does not require specific skills and is not time consuming.

It is another advantage of the present invention that it is unnecessary to mount the original between sheets or plates of transparent material, such as glass, which material could reduce the quality of the scanned image.

In a preferred embodiment of the present invention, the image scanner further comprises feeding means for feeding the original to the supporting means, the feeding means comprising a light table having a grid of lines facilitating the desired positioning of the original. Preferably, the signals from the light detecting means, e.g. a CCD array, are treated in such a way that a line scanned by the light detecting means corresponds to a horizontal line in the scanned image and the moving direction of the original during scanning in the image scanner corresponds to vertical lines in the scanned image. To make it easy for the operator of the image scanner to position the original so that a line that is desired to be a horizontal line in the scanned image will in fact be a horizontal line of the scanned image, the light table comprises a grid of e.g. two sets of parallel lines, perpendicular to each other, one set comprising lines corresponding to horizontal lines in the scanned image and the other set comprising lines corresponding to vertical lines of the scanned image.

In a preferred embodiment of the invention, the original is positioned on the light table in such a way that the top of the original abuts the supporting first rollers and the biassing second rollers of the image scanner. When the operator has positioned the original as desired, the supporting first rollers and the biassing second rollers are rotated so that the original is entered into the image scanner by a nibbling action of the first and second rollers.

To further protect the original during handling, it is preferred to use a holder with the image scanner. Thus, according to the invention a holder is provided for supporting and positioning a sheet formed original to be scanned in an image scanner, and comprising a pair of superposed first and second holder parts made from flexible sheet material for receiving the original therebetween, said first and second holder parts being interconnected at one edge portion and defining substantially aligned first and second openings for exposing the original, the first and second holder parts comprising magnetic means for mutually attracting the holder parts by magnetic forces.

The holder may further comprise a transparent film fixed to one of the holder parts, for covering the first and second openings for even better protection of the original. The transparent film may be made of a color free, transparent plastic, such as polyethylene terephthalate (PET), polyester, etc.

It is an advantage of the holder according to the invention that stretching forces perpendicular to the generatrix of the cylindrical part of the original are applied to the original. The stretching of the original is due to the differences between the radii of the holder parts and the original. The stretching of the original further straightens the original in the scanning direction. The stronger the friction is between the holder parts and the original, the stronger this effect is. The friction may be increased by utilization of adhesive materials, such as glue, such as Post-It® glue, etc, tape, materials of high friction, such as rubber, etc, and by applying a force, such as a magnetic force, etc, to keep the holder parts and the original together.

The holder can be formed in various dimensions to be applicable to originals of several different sizes.

One of the holder parts may have an adhesive layer containing an adhesive for temporarily supporting the original in the vicinity of the interconnection edge portion. The adhesive is preferably of a repetitively usable type such that originals can be repeatedly attached to and detached from the adhesive layer.

An exemplary embodiment of the invention will now be described with reference to the accompanying drawings.

BRIEF DESCRIPTION OF THE DRAWINGS

With reference to FIG. 1, there is shown the scanning section 10 of an image scanner according to the present invention. The scanning section 10 comprises two rotatable supporting rollers 12, 14 that support a holder 16 with an original 18 to be scanned. The holder 16 is biassed against the supporting rollers 12, 14 by rotatable biassing rollers 20, 22. The rotatable supporting rollers 12, 14 are driven in the direction of the arrow 24 by a motor 25 (shown in FIG. 2).

Figure 1:
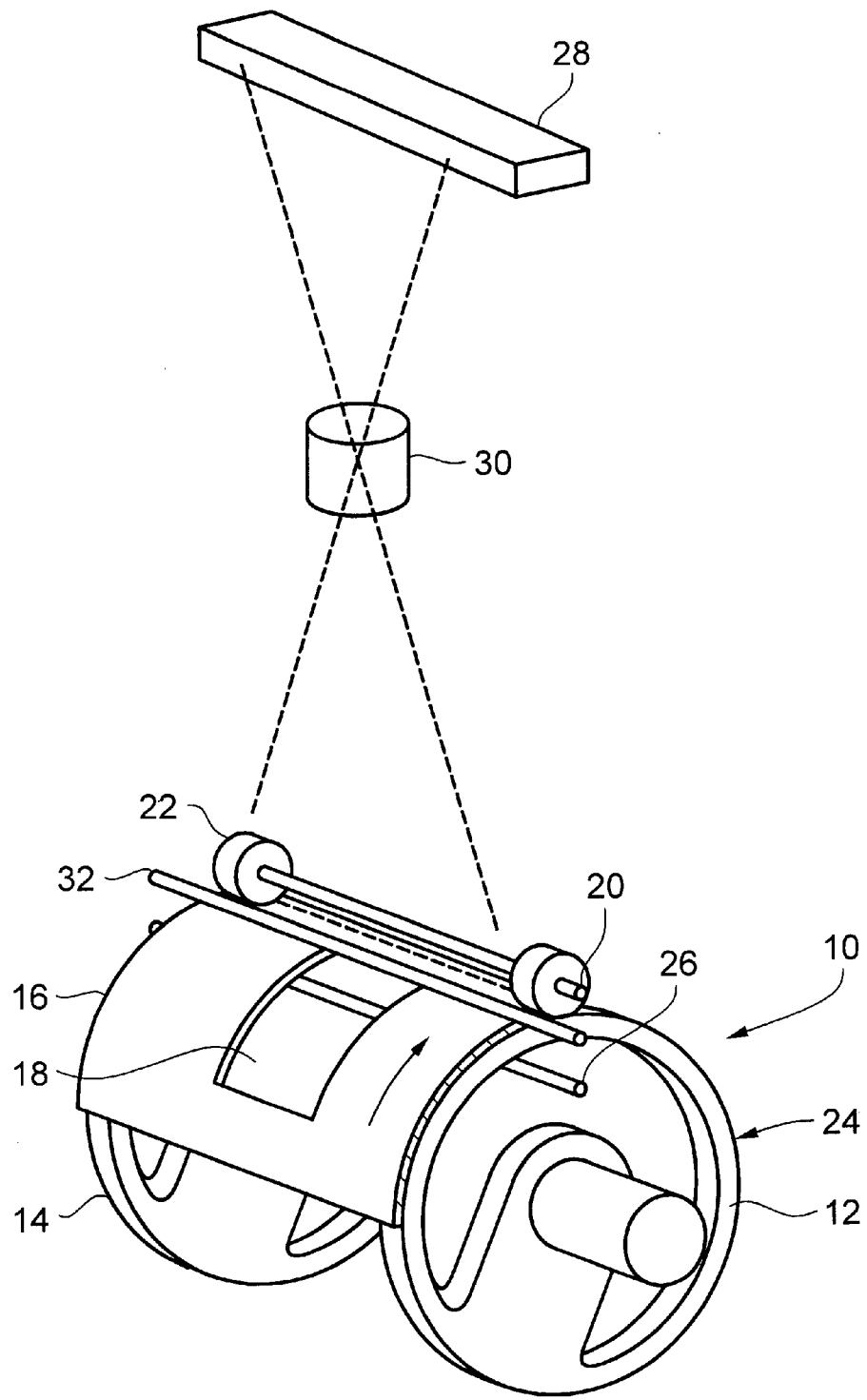
FIG. 1 shows the scanning section of an image scanner according to the present invention.

A light source 26 is mounted inside a virtual cylinder defined by the peripheries of the supporting rollers 12, 14 for generation of light to be transmitted through a transparency 18 and imaged onto the CCD array 28 by a lens 30.

Another light source 32 is mounted outside the virtual cylinder defined by the peripheries of the supporting rollers 12, 14 for generation of light to be reflected from a reflective print 18 and imaged onto the CCD array 28 by a lens 30.

Figure 2:
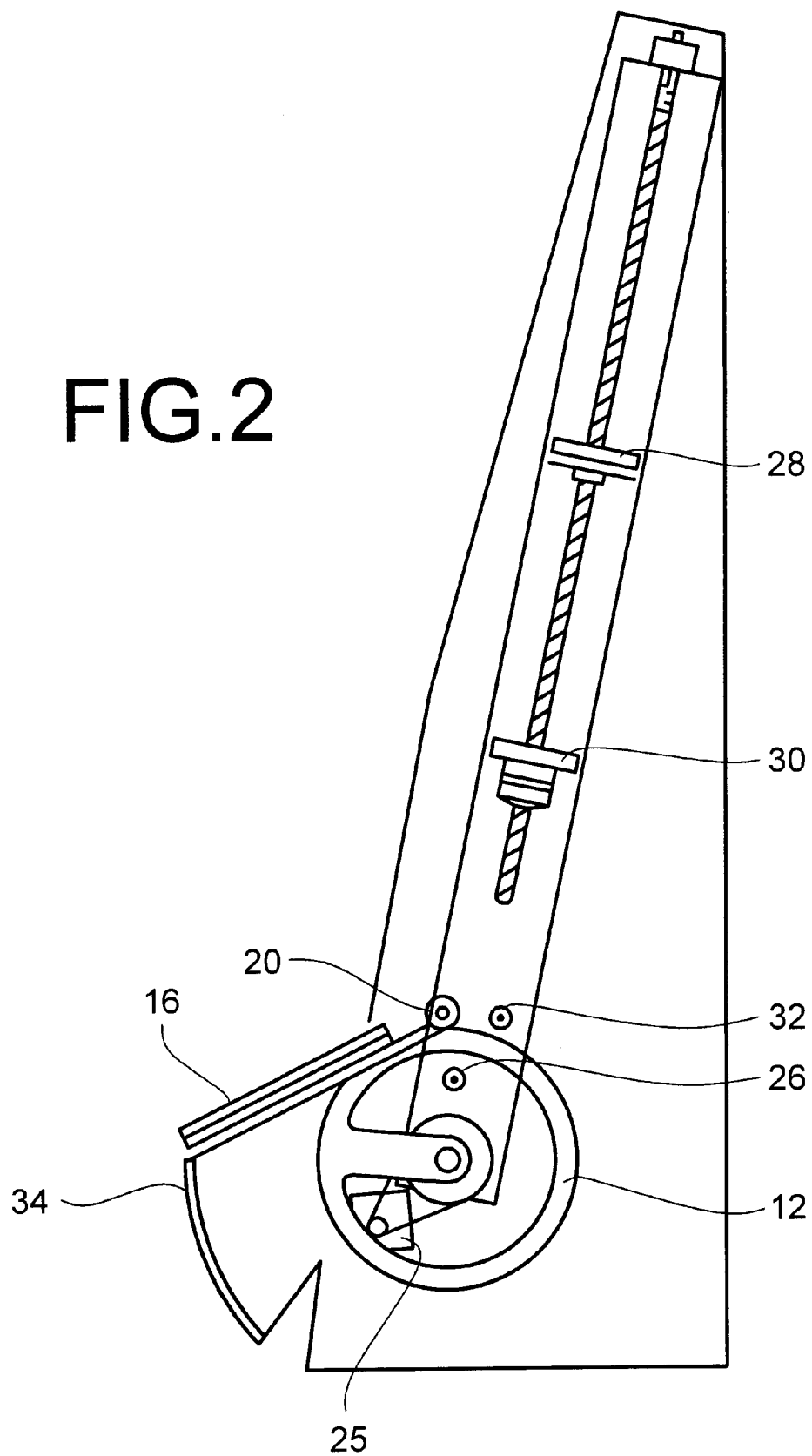
FIG. 2 is a side elevational view of an image scanner according to the present invention.

FIG. 2 shows a side elevational view of an image scanner according to the present invention with a light table 34. A holder 16 is shown positioned on the light table 34. The light source 26 for transmission of light through transparencies 18 is also utilized as a light source 26 for the light table 34. Alternatively, a separate light source for the light table 34 may be provided. The light table 34 has a grid of lines to make it easy for the operator of the image scanner to position the original 18 so that a line that is desired to be a horizontal line in the scanned image will in fact be a horizontal line of the scanned image. The holder 16 is positioned on the light table 34 in such a way that the top of the holder 16 abuts the supporting rollers 12, 14 and the biassing rollers 20, 22 of the image scanner. When the operator has positioned the holder 16 as desired, the supporting rollers 12, 14 and the biassing rollers 20, 22 are rotated so that the holder 16 is entered into the image scanner by a nibbling action of the rollers 12, 14, 22, and 24.

Figure 3:
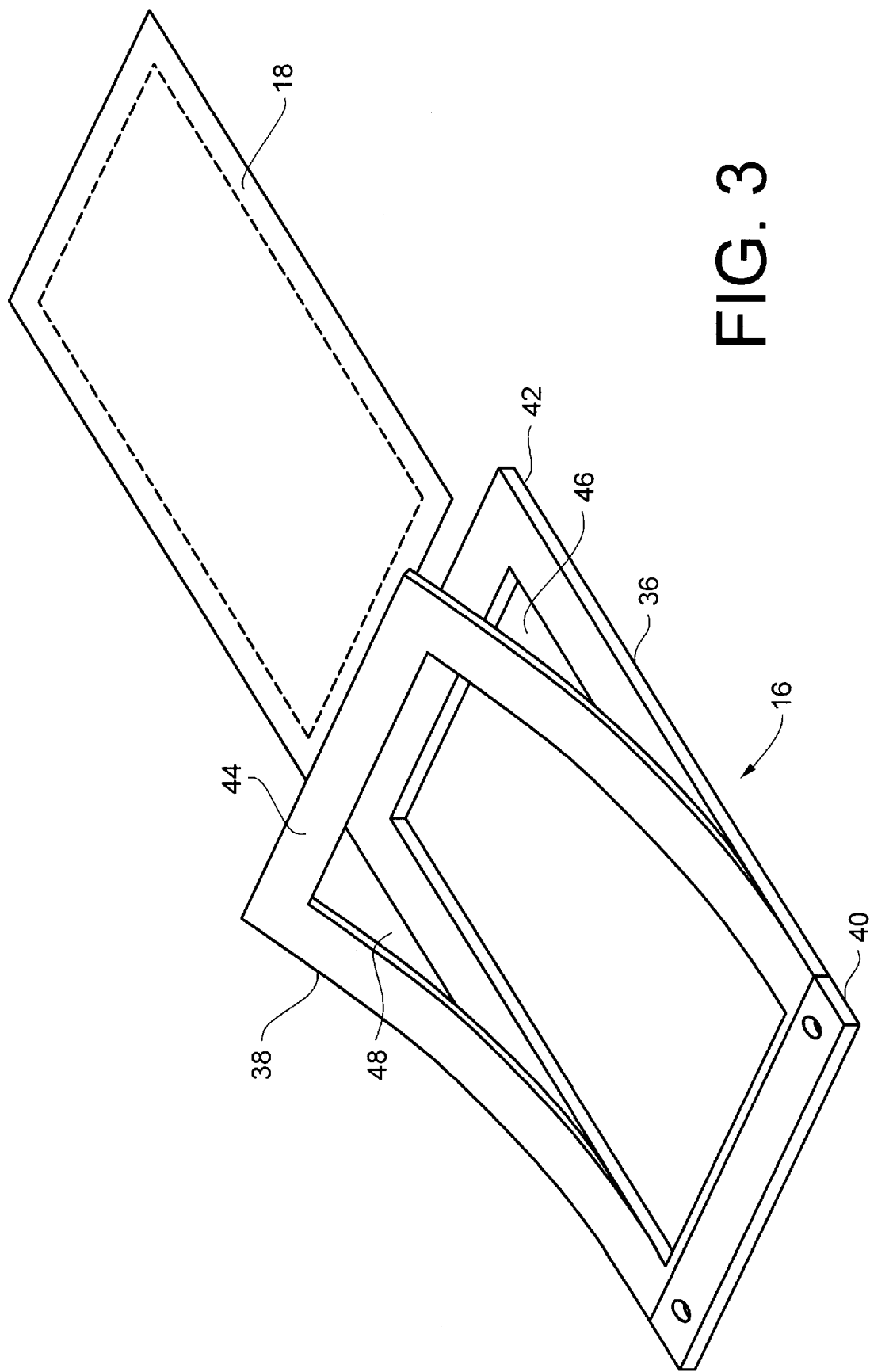
FIG. 3 is a perspective view of a holder according to the present invention.

FIG. 3 shows a perspective view of a holder 16 according to the present invention. The holder 16 comprises two holder parts 36, 38 of flexible materials. The holder parts 36, 38 are integrally joined to each other at interconnected edge portions 40. Opposite the interconnected edge portions 40, the holder parts 36, 38 have free ends 42, 44. The holder parts 36, 38 have openings 46, 48, respectively, for exposing the original 18. The holder 16 may have one or more openings with different dimensions to expose one or more originals of various sizes.

It is presently preferred that the first holder part 36 is a flexible plate made of a material that is responsive to a magnetic field, such as steel, and that the second holder part 38 is a flexible plate made of a magnetic material, such as magnetic rubber.

Figure 4:
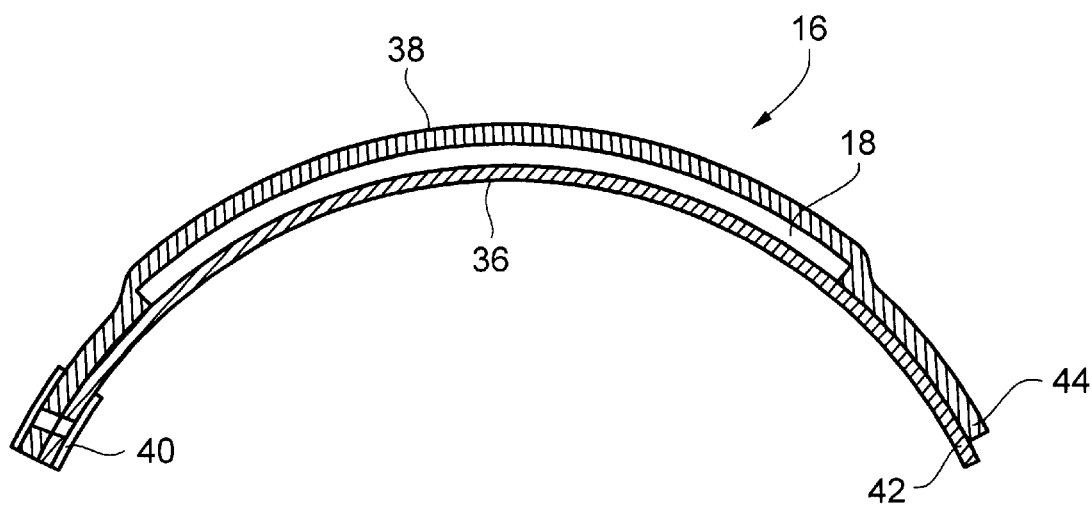
FIG. 4 is a cross sectional view showing a holder according to the present invention supported by supporting rollers (not shown)

FIG. 4 is a cross sectional view showing a holder 16 with an original 18 held therein, the holder 16 being supported by the supporting rollers 12, 14 (not shown).

Figure 5:
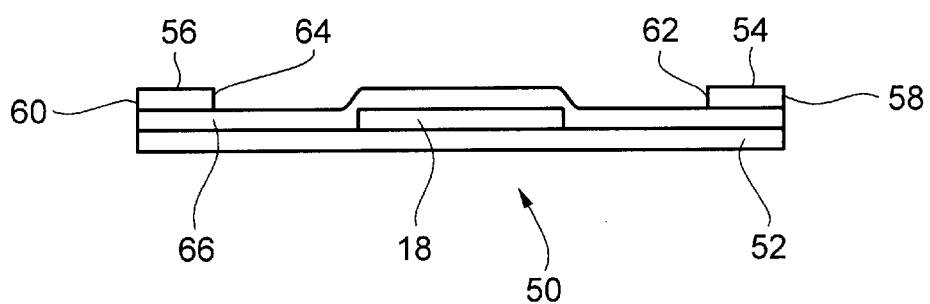
FIG. 5 is a cross sectional view showing another holder according to the present invention.

FIG. 5 is a cross sectional view showing another holder 50 with an original 18 held therein. The holder 50 comprises a metal plate 52 and two strips of magnetized rubber 54, 56, each of which is integrally joined to the metal plate 52 at a fixing end 58, 60. Opposite the fixing end 58, 60, each rubber strip 54, 56 has a free end 62, 64. Each rubber strip 54, 56 may be in a closed position (as shown in FIG. 5) in which position the rubber strip 54, 56 and the metal plate 52 are kept together by magnetic forces.

During operation of the holder 50, the rubber strips 54, 56 are opened and the original 18 is positioned on the metal plate 52. Then, a transparent film 66 of substantially the same size as the metal plate 52 is positioned to cover the original 18 and, finally, the rubber strips 54, 56 are closed so that the transparent film 66 is held between the rubber strips 54, 56 and the metal plate 52.

What is claimed is:

1. A combination comprising:

an image scanner for scanning an original; and
   a holder for supporting and positioning of the original before and during scanning in the image scanner;
   said holder including,
      a pair of superposed first and second holder parts, each made of flexible material, for receiving the original therebetween and having first and second openings, respectively, defined therein for exposing the original, said first and second holder parts being secured by magnetic forces;
   said image scanner including,
      light source means for illuminating the original,
      light detecting means for detecting light transmitted from the original,
      imaging means for imaging a part of the original onto said light detecting means,
      a support including support members, having a circular cylindrical surface facilitating movement of the original passed over and partly around the support members, said support maintaining the part of the original in a substantially cylindrical shape,
      moving means for moving said imaging means and said support in relation to each other in a direction substantially parallel to the generatrix of the cylindrical part of the original whereby the original in said holder is kept flat and straight along a line that is imaged onto said light detecting means, and
      biasing members for biasing the original in the holder against the support members so that the original in the holder enters into the image scanner by a nibbling action of the support members and the biasing members.

2. The combination according to claim 1, wherein the support maintains at least part of the original in a substantially circular cylindrical shape.

3. The combination according to claim 1, wherein said light detecting means comprise a CCD array.

4. The combination according to claim 1, wherein the image scanner further comprises driving means for displacing the support with the original relative to the light detecting means.

5. The combination according to claim 1, further comprising feeding means for feeding the original to the support, the feeding means comprising a light table having a grid of lines facilitating the desired positioning of the original.

6. The combination according to claim 1, wherein the holder further comprises a transparent film fixed to one of the holder parts, for covering the first and second openings.

7. The combination of claim 1, wherein one of said first and second holder parts is made substantially of a material that is responsive to a magnetic field and the other of said first and second holder parts is made substantially of a magnetic material.

8. The combination of claim 1, wherein one of said first and second hold parts includes discrete portions of a material that is responsive to a magnetic field and the other of said first and second holder parts includes distinct portions made of a magnetic material.

9. A method of scanning an original in the form of a sheet, comprising the steps of:

inserting the original into a holder, the holder including a pair of superposed first and second holder parts, each made of flexible material, for receiving the original therebetween and having first and second openings, respectively, defined therein for exposing the original, the first and second holder parts being secured by magnetic forces;

imparting a substantially cylindrical shape to at least part of the original by a support including support members, the support members having a circular cylindrical surface facilitating movement of the original passed over and partly around the support members;

emitting polychrome light for illuminating the cylindrically shaped part of the original;

detecting light transmitted from the cylindrically shaped part of the original with a light detector, moving the cylindrical shaped part of the original in relation to the light detector in a direction substantially parallel to the generatrix of the cylindrical part of the original, whereby the original is kept flat and straight along a line, transmitted light from the line being detected by the light detector, biasing the original in the holder against the support members with biasing members, and engaging the original in the holder with the support members by a nibbling action of the support rollers and the biasing members.

10. The method of claim 9, wherein one of said first and second holder parts is made substantially of a material that is responsive to a magnetic field and the other of said first and second holder parts is made substantially of a magnetic material.

11. The method of claim 9, wherein one of said first and second hold parts includes discrete portions of a material that is responsive to a magnetic field and the other of said first and second holder parts includes distinct portions made of a magnetic material.

\* \* \* \* \*